(12) United States Patent
Lindheimer et al.

(10) Patent No.: US 9,641,531 B2
(45) Date of Patent: May 2, 2017

(54) NODE AND A METHOD FOR ENABLING NETWORK ACCESS AUTHORIZATION

(71) Applicant: TELEFONAKTIEBOLAGET L M ERICSSON (PUBL), Stockholm (SE)

(72) Inventors: Christofer Lindheimer, Linköping (SE); Jari Vikberg, Järna (SE); Ruben Cantano Requena, Boadilla del Monte (ES); Ping Chen, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/423,677

(22) PCT Filed: Feb. 17, 2015

(86) PCT No.: PCT/EP2015/053334
§ 371 (c)(1),
(2) Date: Feb. 24, 2015

(87) PCT Pub. No.: WO2015/124579
PCT Pub. Date: Aug. 27, 2015

(65) Prior Publication Data
US 2016/0044037 A1 Feb. 11, 2016

Related U.S. Application Data

(60) Provisional application No. 61/943,657, filed on Feb. 24, 2014.

(51) Int. Cl.
*H04L 29/06* (2006.01)
*H04W 12/08* (2009.01)
(Continued)

(52) U.S. Cl.
CPC ......... *H04L 63/0892* (2013.01); *H04W 8/12* (2013.01); *H04W 12/06* (2013.01); *H04W 12/08* (2013.01);
(Continued)

(58) Field of Classification Search
USPC ................................. 726/4; 455/411, 433
See application file for complete search history.

(56) References Cited

U.S. PATENT DOCUMENTS

| 8,503,981 | B1 * | 8/2013 | Xue | H04M 1/66 455/411 |
| 2007/0195788 | A1 * | 8/2007 | Vasamsetti | H04W 28/24 370/385.21 |
| 2012/0329455 | A1 * | 12/2012 | Norp | H04W 4/005 455/433 |

FOREIGN PATENT DOCUMENTS

| EP | 1646189 A1 | 4/2006 |
| EP | 1833201 A1 | 9/2007 |

OTHER PUBLICATIONS

"3rd Generation Partnership Project; Technical Specification Group Services and System Aspects; 3GPP system to Wireless Local Area Network (WLAN) interworking; System description (Release 11)", 3GPP TS 23.234 , V11.0.0, Sep. 2012, 84 pages.
(Continued)

*Primary Examiner* — Jason Lee
(74) *Attorney, Agent, or Firm* — Rothwell, Figg, Ernst & Manbeck, P.C.

(57) ABSTRACT

The embodiments herein relate to a method in an AAA server (103) for enabling authorization of a wireless device (101) to access a first network (100a) while simultaneously accessing a second network (100b). The AAA server (103) retrieves information identifying a current SGSN (108) currently serving the wireless device (101) in the second network (100b). When the AAA server (103) retrieves
(Continued)

authorization information for the wireless device's (101) access to the first network (100a) from a HLR (105), the AAA server (103) indicates the current SGSN (108) as a new SGSN to the HLR (105). The indication is to be interpreted by the HLR (105) as an update of location information or a refresh procedure from the current SGSN (108).

19 Claims, 7 Drawing Sheets

(51) Int. Cl.
*H04W 8/12* (2009.01)
*H04W 12/06* (2009.01)
*H04W 8/20* (2009.01)
*H04W 84/12* (2009.01)
*H04W 88/06* (2009.01)

(52) U.S. Cl.
CPC ............ *H04L 63/102* (2013.01); *H04W 8/20* (2013.01); *H04W 84/12* (2013.01); *H04W 88/06* (2013.01)

(56) References Cited

OTHER PUBLICATIONS

"3rd Generation Partnership Project; Technical Specification Group Services and System Aspects; 3GPP system to Wireless Local Area Network (WLAN) interworking; System description (Release 11)", 3GPP TS 22.234 , V11.0.0, Sep. 2012, 15 pages.

"3rd Generation Partnership Project; Technical Specification Group Core Network and Terminals; Mobile Application Part (MAP) specification (Release 12)" 3GPP TS 29.002, v12.3.0, Dec. 2013, 882 pages.

Search Report and Written Opinion issued in corresponding application No. PCT/EP2015/053334, dated May 12, 2015, 11 pages.

* cited by examiner

NODE AND A METHOD FOR ENABLING NETWORK ACCESS AUTHORIZATION

CROSS REFERENCE TO RELATED APPLICATION(S)

This application is a 35 U.S.C. §371 National Phase Entry Application from PCT/EP2015/053334, filed Feb. 17, 2015, designating the United States, and also claims the benefit of U.S. Provisional Application No. 61/943,657, filed Feb. 24, 2014. The disclosures of both applications are incorporated herein in their entirety by reference.

TECHNICAL FIELD

Embodiments herein relate generally to an Authentication, Authorization and Accounting (AAA) server and a method in the AAA server. More particularly, the embodiments herein relate to enabling authorization of a wireless device 101 to access a first network 100a while simultaneously accessing a second network 100b.

BACKGROUND

Wi-Fi is a technology which enables wireless devices to exchange data or connect to the internet wirelessly using radio waves. Wi-Fi is considered to be a key candidate for small cell solutions for mobile broadband heterogeneous networks. Wi-Fi is mainly specified by the Institute of Electrical and Electronics Engineers (IEEE) in the 802.11 family of specifications and updated by for example the Wi-Fi Alliance (WFA). There are currently intense activities in all corners of the world on how to integrate Wi-Fi with Third Generation Partnership Project (3GPP) networks and how to offer a "carrier Wi-Fi" solution where, in a similar fashion as any 3GPP radio access technology, Wi-Fi is integrated with the 3GPP Evolved Packet Core (EPC) and where access selection and traffic steering between 3GPP Radio Access Technologies (RATs) and Wi-Fi may be controlled through the network. Standardization and certification organizations like 3GPP, WFA, Global System for Mobile communications Association (GSMA) and Wireless Broadband Alliance (WBA) are producing material on carrier-integrated Wi-Fi and network equipment manufacturers are making products where Wi-Fi is integrated on different levels.

Current solutions for network integrated Wi-Fi offer a way to seamlessly access Wi-Fi and EPC, authenticating Wi-Fi use through Extensible Authentication Protocol-Subscriber Identity Module (EAP-SIM) or Extensible Authentication Protocol-Authentication and Key Agreement (EAP-AKA) methods towards the same network entities as are used for 3GPP (e.g. a Home Location Register (HLR)). With EAP-SIM and EAP-AKA, there is no need for users of wireless devices to manually enter credentials to access Wi-Fi, but instead, the authentication is done in a similar way as when a cellular network is accessed. In the radio network, solutions are currently being developed for network controlled selection of what access a wireless device and its user should select to get the best service from the network. Such network controlled access selection comprises that wireless devices may perform authentication by using an EAP-SIM/AKA/AKA' procedure. EAP-AKA' is a variant of the EAP-AKA mentioned above.

When performing authentication of Wi-Fi usage, there may also be a wish to authorize a user, and to be able to manage users based on what type of use and service a certain user is authorized to get. One example is that the usage of Wi-Fi is dependent on the subscription the end user has bought and that Wi-Fi is not included in every type of subscription. This may be done via communication with a database, where such authorization data is stored.

One current solution is to use the HLR as the main database for authorization information of users in Wi-Fi and through AAA-HLR communication to see to that authorization is managed and performed. Using the HLR, there is no need to create any second database for authorization related information. Using the HLR, the subscribers in an operator network already have all their information available through the HLR.

It is not until one considers wireless devices that have the capability of being simultaneously attached and in communication with multiple RATs that the problem with using HLR as a database for authorization becomes clear.

The overall requirements related to "dual connectivity" between 3GPP and Wi-Fi has also been documented both in the 3GPP and the GSMA. Examples are as following:

3GPP SA1 TS 22.234, V11.0.0 (For I-WLAN from 3GPP Rel-6, section 5.1.7.2)
"For an integrated WLAN/3GPP device the user shall be able to connect to both the PS domain and to the I WLAN at the same time, to access different services."

3GPP SA2 TS 23.234, V11.0.0 (For I-WLAN from 3GPP Rel-6, section 5.1.2)
"The WLAN connection established for a 3GPP subscriber shall have no impact to the capabilities of having simultaneous PS and CS connections for the same subscriber. (e.g. the HLRSS shall not deregister a PS subscriber when the UE registers on a WLAN)"

GSMA, Official Document TS.22, V2.0 ("Recommendations for Minimal Wi-Fi Capabilities of Terminals"), section 4.7
Maintaining network operator services across varying network technologies provides better network performance through offloading. However, disruption of services should be kept at a minimum when switching between different network technologies e.g. switching from 3G to WLAN.
It is important that the mobile network connection be kept when WLAN access has been performed for the following reasons:
or core network capacity (i.e. no new PDP context establishment on 3GPP on every AP connection).
Charging tickets processing load.
Transparent user interface.

The abbreviations CS, PS, WLAN, I-WLAN, UE, 3G, PDP and AP used above are short for Circuit Switched (CS), Packet Switched (PS), Wireless Local Area Network (WLAN), Interworking-Wireless LAN (I-WLAN), User Equipment (UE), Third Generation (3G), Packet Data Protocol (PDP) and Access Point (AP).

SUMMARY

An objective of embodiments herein is therefore to obviate at least one of the above disadvantages and to provide reduced signaling in a communications network.

According to a first aspect, the objective is achieved by a method in an AAA server for enabling authorization of a wireless device to access a first network while simultaneously accessing a second network. The AAA server retrieves information identifying a current SGSN currently serving the wireless device in the second network. When the AAA server retrieves authorization information for the wireless device's access to the first network from a HLR, the AAA server indicates the current SGSN as a new SGSN to the HLR. The indication is to be interpreted by the HLR as an update of location information or a refresh procedure from the current SGSN.

According to a second aspect, the objective is achieved by an AAA server for enabling authorization of a wireless device to access a first network while simultaneously accessing a second network. The AAA server is arranged to retrieve information identifying a current SGSN currently serving the wireless device in the second network. The AAA server is arranged to, when the AAA server retrieves authorization information for the wireless device's access to the first network from a HLR, indicate the current SGSN as a new SGSN to the HLR. The indication is to be interpreted by the HLR as an update of location information or a refresh procedure from the current SGSN.

Since the AAA server indicates the current SGSN as a new SGSN to the HLR, the HLR interprets the indication as an update of location information or a refresh procedure from the current SGSN. This way, the HLR does not send any cancel location message to the current SGSN and there will be no release procedure as a consequence of authorization of the wireless device. Thus, the signaling is reduced in the communications network.

Embodiments herein may afford many advantages, of which a non-exhaustive list of examples follows:

An advantage of the embodiments herein is that they may allow usage of HLR as an authorization database also for wireless devices that are targeting access/authentication to use of first network while at the same time accessing a second network. This may be done in a way that is coherent with the current standard and thus works with any HLR that is 3GPP compliant. This is solved at the same time as dual connectivity support is not jeopardized.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1A:
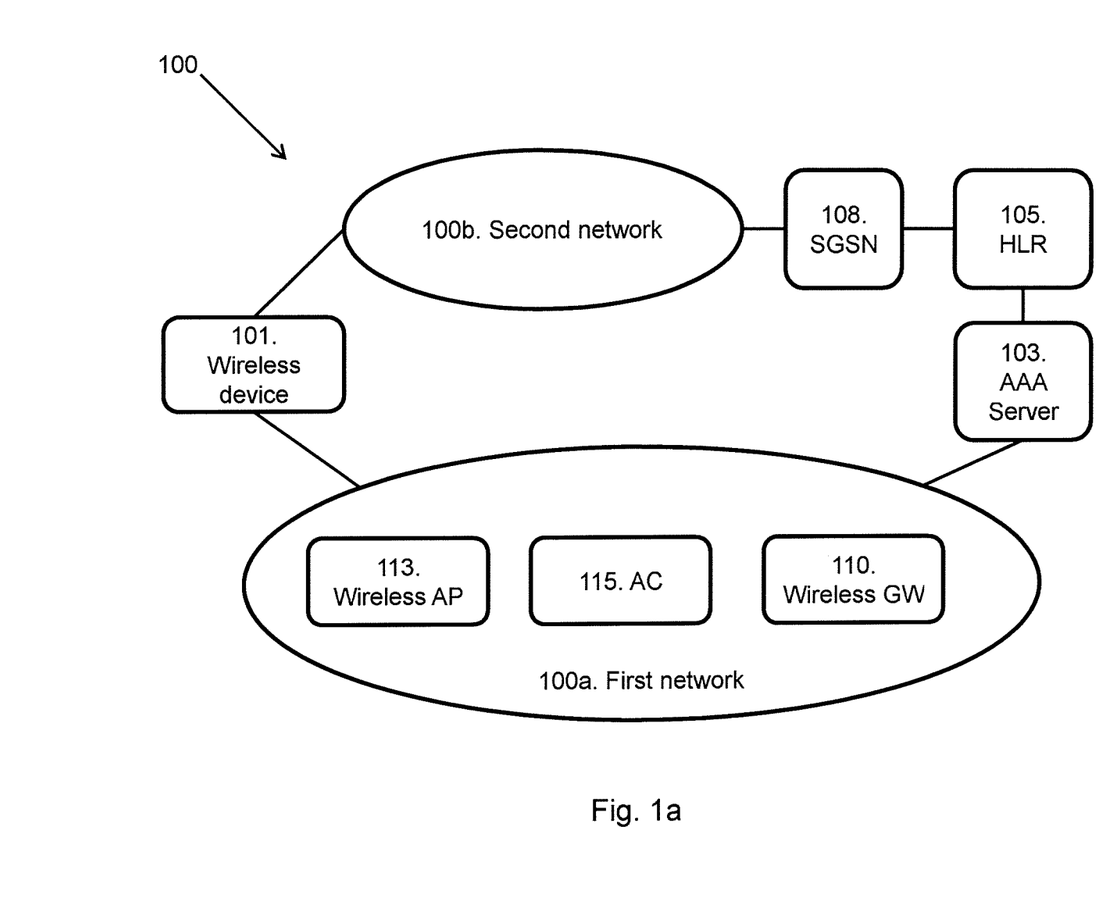
FIG. 1a is a schematic block diagram illustrating embodiments of a communications system.

FIG. 1a depicts an embodiment of a communications system 100 in which embodiments herein may be implemented. The communications system 100 may be seen as a combination of radio access networks and one or more core networks depending on network configuration.

The communications system 100 comprises a first network 100a and a second network 100b. The first and second networks 100a, 100b may be seen as radio access networks. The first network 100a and the second network 100b may apply different access technologies. The first network 100a may be a wireless network such as e.g. a Wi-Fi network, and the second network 100b may be a 3GPP network, such as e.g. a Wideband Code Division Multiple Access (WCDMA) network or a Global System for Mobile Communications (GSM) network.

A wireless device 101 may access at least one of the first network 100a and the second network 100b. The wireless device 101 may be a device by which a subscriber may access services offered by a cellular or mobile operator's network and services outside the cellular or mobile operator's network to which the cellular or mobile operator's radio access network and core network provide access, e.g. access to the Internet. The wireless device 101 may be any device, mobile or stationary, enabled to communicate in the communications system 100, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The wireless device 101 may be portable, pocket storable, hand held, computer comprised, or vehicle mounted devices, enabled to communicate voice and/or data, via a radio access network, with another entity, such as another device or a server.

The first network 100a may comprise at least one first network node, such as a wireless Access Point (wireless AP) 113, an Access Controller (AC) 115 and a wireless GateWay (wireless GW) 110. The wireless AP 113 may allow the wireless device 101 to connect to e.g. a wired network such as e.g. the Internet, or other wireless devices using Wi-Fi or other related wireless standards. The AC 115 is an example of a first network node which may handle access control, usage monitoring and policy enforcement in the first network 100a. The wireless GW 110 may be responsible for routing packets between e.g. the first network 100a and the Internet. The wireless GW 110 may be connected to the cellular/mobile operator's core network (CN). The AC 115 and the wireless GW 110 may be separate entities or they may be one entity, i.e. the AC 115 and wireless GW 110 may be co-located in one entity. The first network 100a may comprise additional first network nodes in addition to the ones exemplified in FIG. 1a. Some of these additional first network nodes may be seen in FIG. 1b, which will be described in more detail below.

The second network 100b comprises at least one second network node (not shown in FIG. 1a). Some of these second network nodes are seen in FIG. 1b, which will be described in more detail below.

The communications system 100 further comprises a Serving GPRS Support Node (SGSN) 108, a HLR 105 and an AAA server 103. GPRS is short for general packet radio service. The SGSN 108 may be described as being responsible for delivery of packets to and from the wireless device 101 within the service area of the SGSN 108. The HLR 105 may be described as a database comprising information associated with subscribers that are authorized to access the second network 100*b* and also the first network 100*a*, e.g. a subscriber database. The HLR 105 may comprise information associated with Subscriber Identity Module (SIM) cards issued by the wireless device operator. Such information may be e.g. International mobile Subscriber Identity (IMSI), Mobile Station International Subscriber Directory Number (MSISDN) etc. The AAA server 103 may be a node which handles which users are allowed access to which services (by performing both authentication and authorization of the users) and tracking the services that they have used (by performing accounting of the users). AAA may for instance be related to at least one of protocols: the Mobile Application Part (MAP) protocol, the Remote Authentication Dial In User Service (RADIUS) protocol and the Diameter protocol.

Figure 1B:
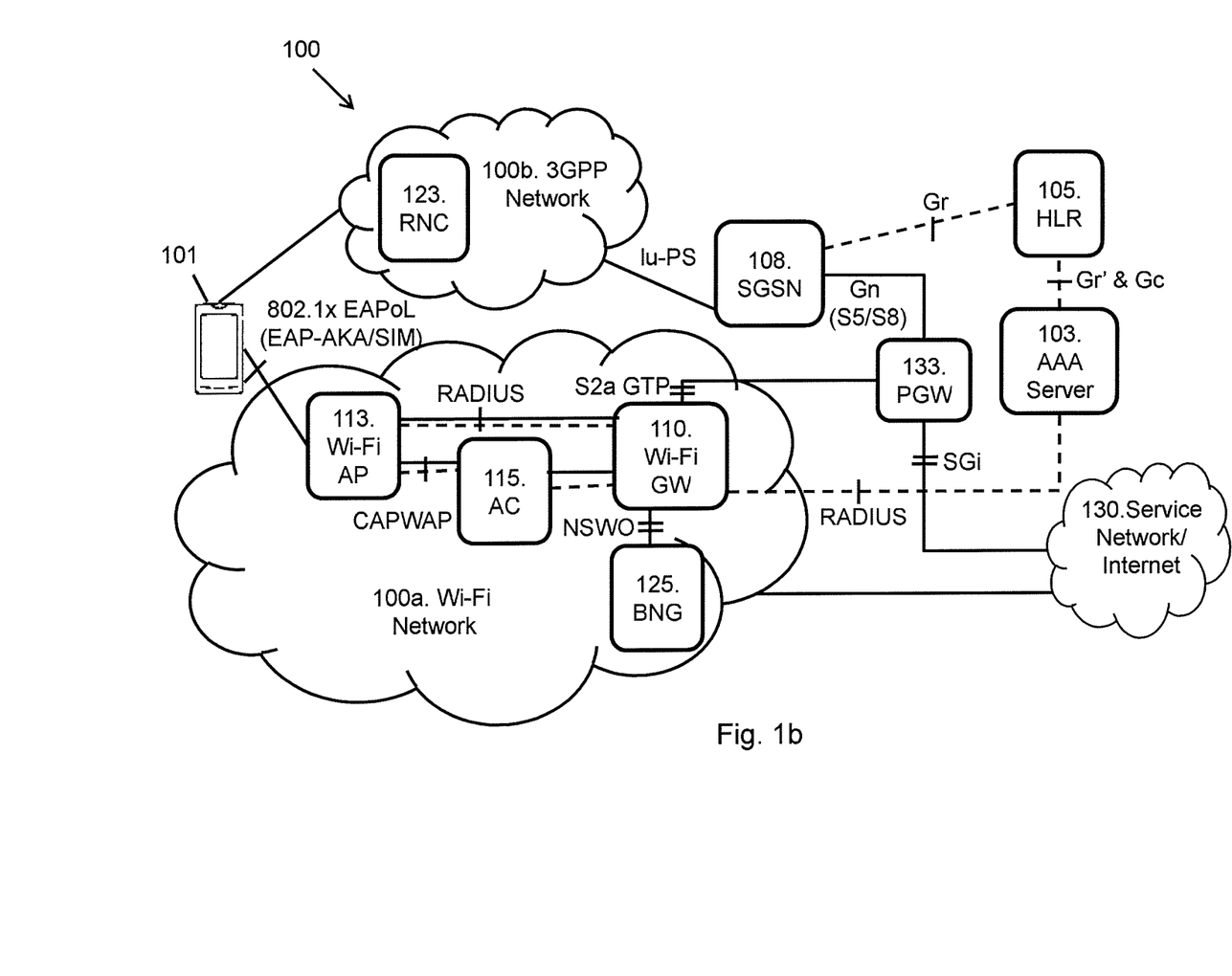
FIG. 1b is a schematic block diagram illustrating embodiments of a communications system.

FIG. 1*b* depicts an embodiment of the communications system 100 in which embodiments herein may be implemented. FIG. 1*b* illustrates additional nodes in the system 100 compared to FIG. 1*a*. The solid lines between the entities in FIG. 1 illustrate the control plane and the user plane. The dotted lines between the entities in FIG. 1 illustrate only the control plane (i.e. signaling).

In FIG. 1*b*, the first network 100*a* is exemplified by a Wi-Fi network and the second network 100*b* is exemplified by a 3GPP Universal Terrestrial Radio Access Network (UTRAN) network. Note that the second network 100*b* is not limited to a 3GPP network and that it may also be e.g. a Wi-Fi network.

As also seen in FIG. 1*a*, the communications system 100 illustrated in FIG. 1*b* comprises a wireless device 101. In FIG. 1*b*, the wireless device 101 may be served by a Radio Access Network (RAN) node such as a Radio Network Controller (RNC) 123 in the 3GPP network 100*b*, i.e. the RNC 123 is an example of a second network node. It should be understood that the RNC 123 may be connected to a number of base stations that communicate with the wireless device 101.

In the embodiment of the communications system 100 illustrated in FIG. 1*b*, the wireless AP 113 is represented by a Wi-Fi AP 113 and the wireless GW 110 may be represented by a Wi-Fi GW 110.

The wireless device 101 may be connected to the Wi-Fi AP 113 using e.g. 802.1x Extensible Authentication Protocol (EAP) over LAN (EAPoL) (e.g. EAP-AKA/SIM). The Wi-Fi AP 113 may be connected to the AC 115 via a Control And Provisioning of Wireless Access Points (CAPWAP) interface. The Wi-Fi GW 110 may be connected to the Wi-Fi AP 113 for example using an interface based on a RADIUS protocol.

The Wi-Fi GW 110 may be connected to a Broadband Network Gateway (BNG) 125. The connection between the Wi-Fi GW 110 and the BNG 115 may be based on Non-Seamless Wi-Fi Offload (NSWO), also referred to as Local Breakout (LBO). The BNG 125 may be seen as a gateway to the service network/Internet 130.

The Wi-Fi GW 110 may be connected to a Packet data network GateWay (PGW) 133. The connection between the Wi-Fi GW 110 and the PGW 133 may be based on S2a GTP. GTP is short for GPRS Tunneling Protocol. The PGW 133 may be connected to the service network/Internet 130 e.g. via a SGi interface.

The PGW 133 may be connected to a SGSN 108, for example via a Gn (S5/S8) interface. The SGSN 108 may also be connected to the PGW 133 via a SGW (not shown in FIG. 1*b*), and in this case the interface between the SGSN 108 and the SGW is the S4 interface, and the interface between the SGW and PGW 133 is the S5/S8 interface. The SGSN 108 may be connected to the 3GPP UTRAN network 100*b* via e.g. the Iu-PS interface.

The SGSN 108 may be connected to the HLR 105 for example via a Gr interface.

The HLR 105 may be connected to the AAA server 103 for example via at least one of a Gr' interface and a Gc interface. The AAA server 103 may be connected to the Wi-Fi GW 110 using a connection based on e.g. the RADIUS protocol.

The PGW 133 and the SGSN 108 may be seen as being part of a Core Network (CN).

It should be noted that the links between the nodes in the communications system 100 may be of any suitable kind including either a wired or wireless link. The links may use any suitable protocol depending on type and level of layer (e.g. as indicated by the Open Systems Interconnection (OSI) model) as understood by the person skilled in the art.

Figure 2:
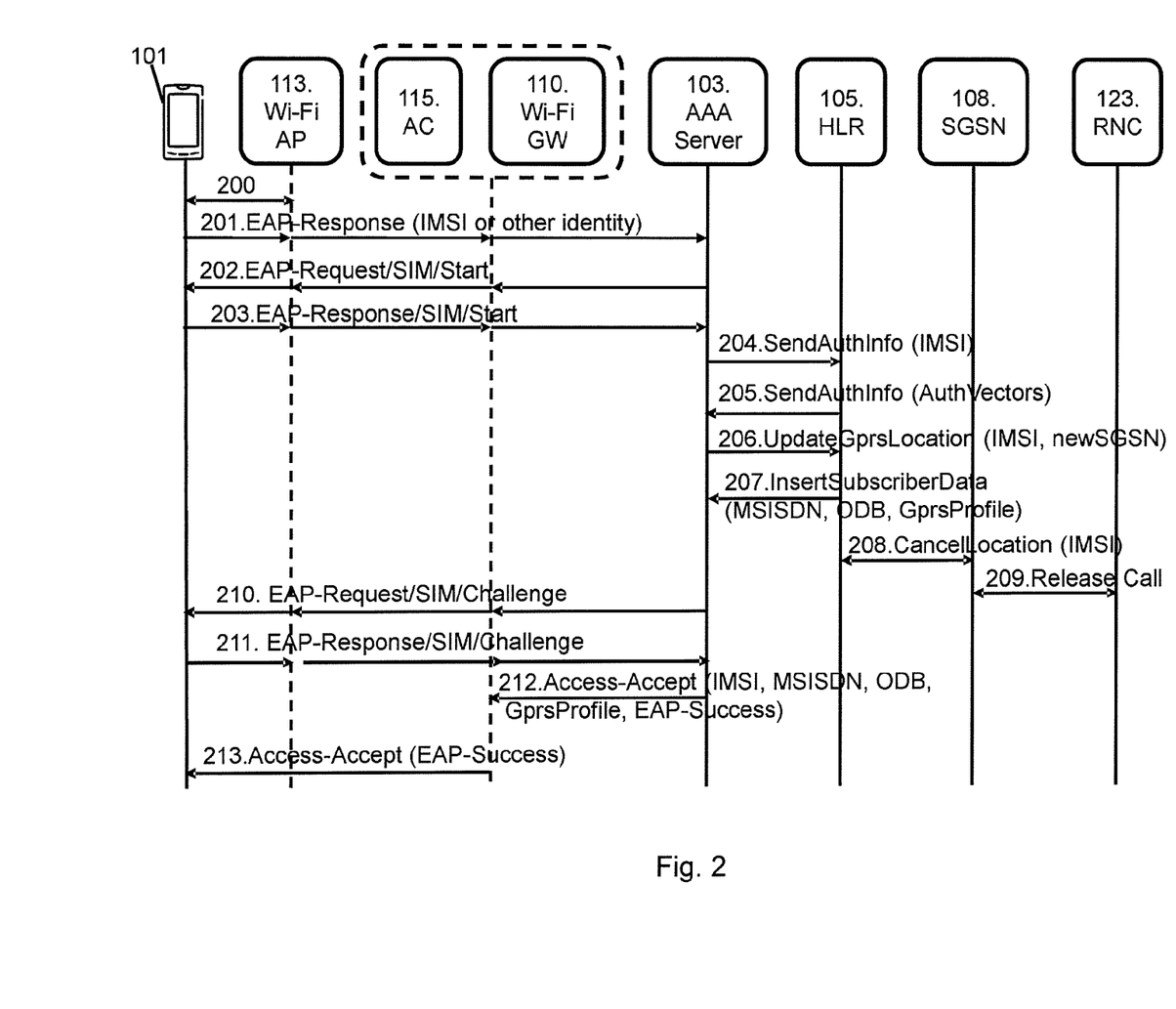
FIG. 2 is a signaling diagram illustrating embodiments of a method.

A problem using the HLR 105 as a database for authorization purposes relates to the standardized MAP signaling sequences for retrieving subscriber data. An example of such signaling sequence is illustrated in FIG. 2. FIG. 2 is based on the embodiment of the communications system 100 illustrated in FIG. 1*b*, but is equally applicable to the communications system 100 illustrated in FIG. 1*a*. The dotted box around the AC 115 and the Wi-Fi GW 110 illustrates that these entities may be co-located in one entity.

Before step 201, initial steps may take place between the wireless device 101 and the Wi-Fi AP 113 (depicted with the arrow 200 before step 201 in FIG. 2). These steps may comprise for example beacon or probe request/probe response, open system authentication request/open system authentication response, association request/association response and identity request. The identity request is sent from the Wi-Fi AP 113 to the wireless device 101 and may be an EAP-Request/Identity message.

The method illustrated in FIG. 2 comprises at least some of the following steps, which steps may be performed in any suitable order than described below:

Step 201

The wireless device 101 may transmit an access response message to the AAA server 103. The access response message may be an EAP-Response message as seen in FIG. 2. This message may be conveyed from the wireless device 101, through at least one of the Wi-Fi AP 113, the AC 115 and the Wi-Fi GW 110 on its way to the AAA server 103, indicated with three arrows in FIG. 2. The access response message may be a response to an identity request for access to the first network 100*a*, e.g. the Wi-Fi network (the request is not illustrated in FIG. 2).

The access response message may comprise information identifying the wireless device 101, e.g. an IMSI or any other suitable parameter identifying the wireless device 101. The access response message may also indicate that the wireless device 101 supports EAP-SIM authentication.

FIG. 2 does not show all the details for example in signaling between the wireless device 101 and the Wi-Fi AP 113. For example, the access response message can be triggered by the Wi-Fi AP 113 based on other signaling received from the wireless device 101. In addition, the EAP-SIM signaling between the wireless device 101 and the AAA server 103 may be carried in EAPOL messages between the wireless device 101 and the Wi-Fi AP 113, and in RADIUS messages between the Wi-Fi AP 113 and the AAA server 103. In some embodiments, the AAA server 103 may be co-located with a Mobile Application Part GateWay (MAP GW) functionality (not shown in FIG. 2) that performs the needed actions to convert between the authentication signaling towards the wireless device 101 and the MAP protocol signaling towards the HLR 105.

Step 202

The AAA server 103 may send a request message to the wireless device 101. This request message may be an EAP-Request message. The EAP-Request message may be of the SIM type and of subtype Start, indicated as EAP-Request/SIM/Start in FIG. 2. This request message may be conveyed from the AAA server 103, through at least one of the Wi-Fi GW 110, the AC 115 and the Wi-Fi AP 113 on its way to the wireless device 101, indicated with three arrows in FIG. 2.

The EAP-Request/SIM/Start message may comprise an EAP-SIM parameter. In this case, the EAP-SIM parameter indicates that an EAP-SIM procedure has been initiated. The EAP-SIM parameter may also include a list of supported EAP-SIM versions. As mentioned above, EAP-SIM is a mechanism for authentication and session key generation. Examples of an EAP-SIM parameter may be a session key, EAP-SIM version etc.

Step 203

The wireless device 101 may send a response message to the AAA server 103. The response message may be an EAP-Response message of the SIM type and of subtype Start. The response message in step 203 may be a response to the request message in step 202. This message may be conveyed from the wireless device 101, through at least one of the Wi-Fi AP 113, the AC 115 and the Wi-Fi GW 110 on its way to the AAA server 103, indicated with three arrows in FIG. 2.

The EAP-Response/SIM/Start message may comprise an EAP-SIM parameter indicating a randomly selected number as well as the selected EAP-SIM version.

Step 204

The AAA server 103 may send a request message comprising a request for authentication information to the HLR 105. The request message may be a SendAuthInfo message (for example as defined in 3GPP TS 29.002 V12.3.0 in section 8.5.2 as MAP_SEND_AUTHENTICATION_INFO). The request may comprise information identifying the wireless device 101, such as the IMSI or any other suitable parameter identifying the wireless device 101.

Step 205

The HLR 105 may send a response message back to the AAA server 103, i.e. a response to the request message in step 204. The response may be a SendAuthInfo response message. The response message may comprise information identifying authentication vectors.

Step 206

The AAA server 103 may send a message comprising updated GPRS location information to the HLR 105. The request may be an UpdateGprsLocation message (for example as defined in 3GPP TS 29.002 V12.3.0 in section 8.1.7 as MAP_UPDATE_GPRS_LOCATION). Such updated GPRS location may be at least one of information identifying the wireless device 101, e.g. IMSI, and information identifying a new SGSN 108.

Step 207

The HLR 105 may send, to the AAA server 103, a message comprising subscription information associated with the wireless device 101 and the new SGSN 108 indicated in the UpdateGPRSLocation message in step 206. Such message may be e.g. an InsertSubscriberData message (for example as defined in 3GPP TS 29.002 V12.3.0 in section 8.8.1 as MAP_INSERT_SUBSCRIBER_DATA). The message may comprise at least one of a MSISDN, Operator Determined Barring (ODB) and GprsProfile.

Step 208

The HLR 105 sends, to the current SGSN 108 serving the wireless device 101, information indicating cancelling of the connection to the current SGSN 108, e.g. a CancelLocation message. The current SGSN 108 can also be seen as an old SGSN 108 for the HLR 105, i.e. it is the SGSN 108 the HLR 105 had information stored about before the HLR 105 received the UpdateGPRSLocation message in step 206. The CancelLocation message may comprise an identifier of the wireless device 101, e.g. the IMSI associated with the wireless device 101. Note that the reference number 108 is used for both the current SGSN and the new SGSN in this text.

Step 209

The current SGSN 108 and the RNC 123 releases the connection, e.g. a data session, between them.

Step 210

The AAA server 103 sends a request message to the wireless device 101. The request message may be an EAP-request message of type SIM and of subtype challenge, indicated as EAP-Request/SIM/Challenge in FIG. 2. The request message may be sent via at least one of the Wi-Fi GW 110, the AC 115 and the Wi-Fi AP 113 on its way to the wireless device 101, indicated with the three arrows in FIG. 2.

Step 211

The wireless device 101 sends a response message to the AAA server 103. The response message is a response to the request message in step 210. The response message may be an EAP-response message of type SIM and of subtype Challenge, indicated as EAP-Response/SIM/Challenge in FIG. 2. The response message may be sent via at least one of the Wi-Fi AP 113, the AC 115 and the Wi-Fi GW 110 on its way to the AAA server 103, indicated with three arrows in FIG. 2.

Step 212

The AAA server 103 sends an Access-Accept message to at least one of the Wi-Fi GW 110 and the AC 115 or to the co-located Wi-Fi GW 110 and AC 115. The Access-Accept message may comprise at least one of an IMSI, MSISDN, ODB, GprsProfile and EAP-success indicator. The accept message indicates that the request for access in step 201 has been accepted.

Step 213

At least one of the Wi-Fi GW 110 and the AC 115 or the co-located Wi-Fi GW 110 and the AC 115 sends an EAP success message to the wireless device 101. This message is indicated as Access-Accept in FIG. 2. The EAP success message may comprise an EAP-success indicator indicating that the EAP has been successful.

Steps 210, 211, 212 and 213 in FIG. 2 are according to existing EAP-SIM signaling procedures to finalize the EAP-SIM signaling and to indicate the success of the EAP-SIM signaling to the Wi-Fi AP 113.

When the AAA server 103 is to retrieve subscriber data from the HLR 105, the AAA server 103 would need to "mimic" or act as a new SGSN 108. The information needed, (e.g. Access Point Names (APNs), and other wireless device related information) from the HLR 105 would be sent in a message InsertSubscriberData (3GPP TS 29.002 v12.3.0 section 8.8.1 MAP_INSERT_SUBSCRIBER_DATA) that is generally sent from the HLR 105 to the SGSN 108. Triggering this message may currently only be done through a location update procedure (i.e. to inform the HLR 105 that a wireless device 101 has moved to another SGSN 108). There is no need to do it otherwise, as any serving SGSN 108 in the 3GPP UTRAN network 100b would already have the information, unless the location of the wireless device 101 is updated. Thus, the AAA server 103 needs to send the message UpdateGPRSLocation comprising parameters such as e.g. IMSI and New SGSN, etc. (defined in 3GPP TS 29.002 v12.3.0 section 8.1.7 MAP_UPDATE_GPRS_LOCATION) to be able to retrieve the information needed to authorize users on the first network side 100a, e.g. the Wi-Fi side.

When the HLR 105 sends the information to the AAA server 103, the HLR 105 would then also trigger a Cancel-Location message (e.g. such as described in 3GPP TS 29.002, v12.3.0, section 8.1.3 MAP_CANCEL_LOCATION) to be sent to the old SGSN 108. As from the HLR 105 perspective, the location of the wireless device 101 is now updated. This, in turn would cause the SGSN 108 to release the voice call or the PS session on the 3GPP UTRAN side towards the RNC 123 and towards the wireless device 101 (step 209 in FIG. 2).

Given that wireless devices 101, for example with dual radio capabilities, are capable of simultaneous connection to multiple networks, e.g., through Multiple-Access PDN CONnectivity (MAPCON), MultiPath Transmission Control Protocol (MPTCP), Internet Protocol Flow Mobility (IFOM) support, this is not a desired behavior. In many instances, communication towards one network should be kept, even though communication towards another network is initiated.

One solution to this problem may be to simply not use the HLR 105 for authorization purposes, but as this is such a convenient solution, it would be desirable if a solution to this dual simultaneous connectivity problem could be solved, given any HLR 105 vendor.

A method for enabling authorization of a wireless device 101 to access a first network 100a when it is a wireless network, e.g. a Wi-Fi network, according to some embodiments will now be described with reference to the signaling diagram depicted in FIG. 3. Initially, the wireless device 101 has been authorized access to the second network 100b. The method seen in FIG. 3 comprises at least some of the following steps, which steps may as well be carried out in another suitable order than described below:

Step 301

The wireless device 101 may send, to the AAA server 103, a request for access to the first network 100a. The wireless device 101 may send this request via at least one of the wireless AP 113, the AC 115 and the wireless GW 110 before it reaches the AAA server 103. The first network 100a may apply a first RAT type. The first RAT type may be e.g. Wi-Fi or 3GPP (e.g. 2G, 3G, 4G, or 5G). The first network 100a may be a network where authorization information associated with the second network 100b is comprised in the HLR 105.

The wireless device 101 may send the request to access to the first network 100a at any time after it has accessed the second network 100b. The wireless device 101 may send the request message via a number of other nodes such as e.g. the Wireless AP 113, the AC 115 and the Wireless GW 110.

Before step 301, the wireless device 101 have previously requested and been granted access to the second network 100b. The second network 100b may apply a second RAT type. The second RAT type may be e.g. Wi-Fi or 3GPP (e.g. 2G, 3G, 4G or 5G).

The following table 1 comprises examples of combinations of RAT types applied by the first and second networks 100a, 100b. The left column comprises the examples of the RAT type applied by the first network 100a and the right column comprises examples of the RAT type which may be applied by the second network 100b:

TABLE 1

| First network 100a | Second network 100b |
| --- | --- |
| Wi-Fi | Wi-Fi |
| Wi-Fi | 2G |
| Wi-Fi | 3G |
| Wi-Fi | 4G |
| Wi-Fi | 5G |

The table above illustrates only examples of the combinations of RAT types. However, any other types than the ones exemplified above and in any combination is also applicable. Furthermore, even though FIGS. 1a, 1b and 3 illustrate two networks, i.e. the first network 100a and the second network 100b, the embodiments herein are equally applicable to any other number of networks comprised in the communications system 100.

Step 302

When the wireless device 101 has requested access to the first network 100a, the AAA server 103 may send a request message to the HLR 105. The request message may be a request for information indicating the current SGSN 108 which currently serves the wireless device 101. The information indicating the current SGSN 108 may be a first identity of the current SGSN 108 serving the wireless device 101 in the second network 100b. The first identity of the current SGSN 108 may be e.g. the location of the SGSN 108, e.g. an IP address. The terms current SGSN, old SGSN, current serving SGSN and old serving SGSN may be used interchangeably in this text when referring to the SGSN which is currently serving the wireless device 101. The term new SGSN refers to the SGSN which will serve the wireless device 101 sometime in the future.

Step 303

The AAA server 103 may receive, from the HLR 105, a response message comprising the requested information indicating the current SGSN 108, e.g. the first identity of the current SGSN 108. The response message may be a response to the request message in step 302.

Step 304

The AAA server 103 may obtain further information indicating the current SGSN 108, e.g. a second identity of the current SGSN 108. The second identity may be obtained based on the first identity of the current SGSN 108 received from the HLR 105 in step 303. The AAA server 103 may comprise a table with associations between all first and second identities of all possible SGSNs. So, when obtaining the information indicating the second identity, the AAA server 103 may look in the table to find the second identity which corresponds to the first identity that it has received from the HLR 105 in step 303. The second identity may be a SGSN number, e.g. an Integrated Services Digital Network (ISDN) number. A table is only an example of how the information may be organized. Any other ways of organizing the information may also be applicable such as e.g. a list, a tree information structure etc.

Step 305

The AAA server 103 may transmit, to the HLR 105, information indicating the current SGSN 108 (e.g. the first identity and the second identity of the current SGSN 108) and an identity of the wireless device 101 to trigger the HLR 105 to send the information associated with authorization of the wireless device 101. This transmitted information indicating the first identity and the second identity of the current SGSN 108 is the same information as the one currently comprised in the HLR 105.

Step 306

The AAA server 103 may receive, from the HLR 105, information associated with authorization of the wireless device 101 to access the first network 100*a*. The HLR 105 finds this information based on the identity of the wireless device 101 that was transmitted to it in step 305.

Step 307

Based on the received authorization information, the AAA server 103 may authorize the wireless device 101 to access the first network 100*a*. Thus, the wireless device 101 may access both the first and second network 100*a*, 100*b* at the same time, i.e. simultaneously.

Figure 4:
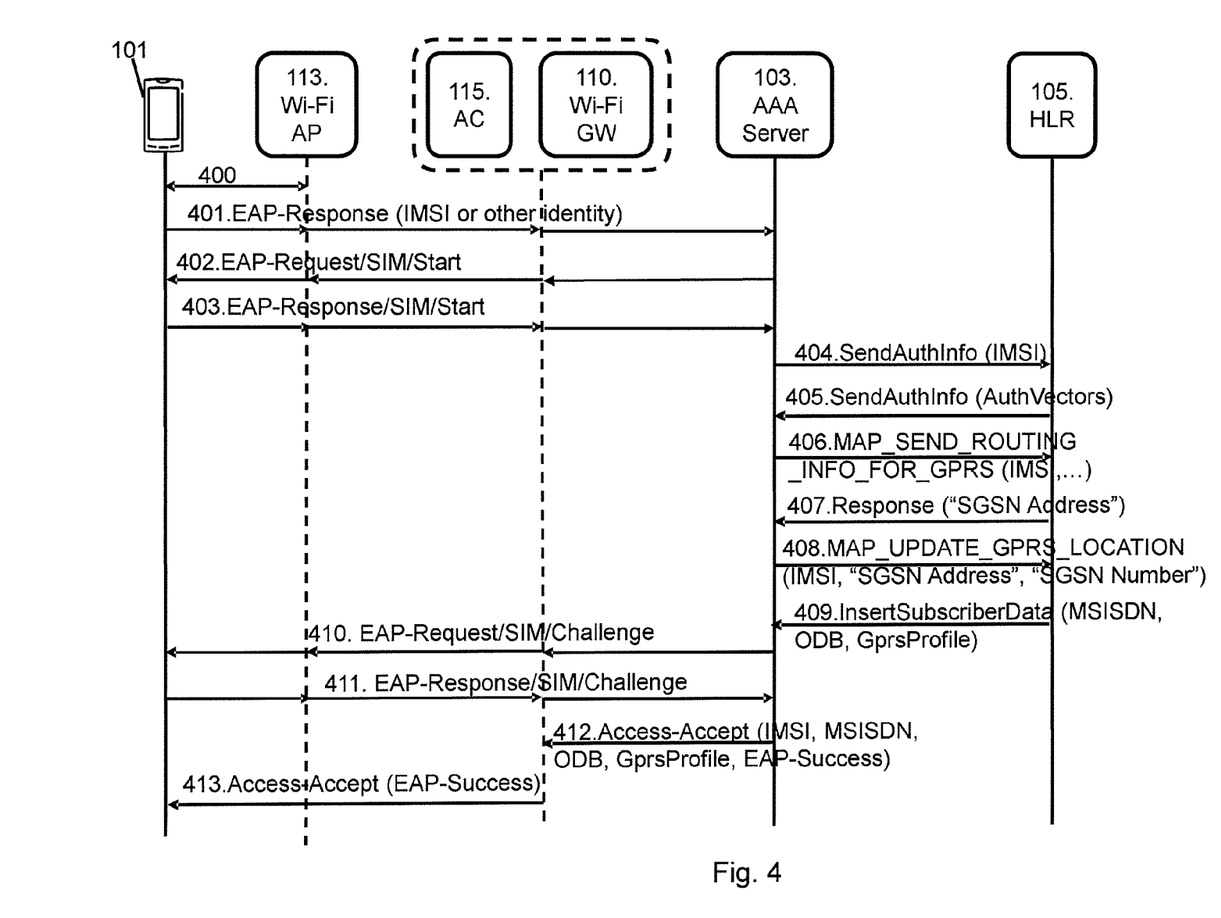
FIG. 4 is a signaling diagram illustrating embodiments of a method.

A method for handling authorization of a wireless device 101 to access a first network 100*a*, according to some embodiments will now be described with reference to the signaling diagram depicted in FIG. 4. In FIG. 4, the first network 100*a* is represented by a Wi-Fi network and the second network 100*b* is represented by a 3GPP network. Before step 401, initial steps may take place between the wireless device 101 and the Wi-Fi AP 113 (depicted with the arrow 400 before step 401 in FIG. 4). These initial steps represented by arrow 400 in FIG. 4 may comprise for example a beacon signal or probe request and probe response message, an open system authentication request and an open system authentication response message, an association request and an association response message and an identity request message. The identity request message is sent from the Wi-Fi AP 113 to the wireless device 101 and may be an EAP-Request/Identity message. The nodes participating in the method in FIG. 4 are the ones as exemplified in FIG. 1*b*. The method comprises at least some of the following steps, which steps may as well be carried out in another suitable order than described below:

Step 401

This step corresponds to step 201 in FIG. 2. The wireless device 101 may transmit an EAP-Response message to the AAA server 103. This message may be conveyed from the wireless device 101, through at least one of the Wi-Fi AP 113, the AC 115 and the Wi-Fi GW 110 on its way to the AAA server 103, indicated with three arrows in FIG. 4.

The EAP Response message may comprise information identifying the wireless device 101, e.g. an IMSI or any other suitable parameter identifying the wireless device 101. In some embodiments, the AAA server 103 may be co-located with a MAP GW (not shown in FIG. 3).

Step 402

This step corresponds to step 202 in FIG. 2. The AAA server 103 may send an EAP-Request/SIM/Start message to the wireless device 101, where SIM is the type and Start is the subtype of the EAP-Request message. This message may be conveyed from the AAA server 103, through at least one of the Wi-Fi GW 110, the AC 115 and the Wi-Fi AP 113 on its way to the wireless device 101, indicated with three arrows in FIG. 4.

The EAP-Request/SIM/Start message may comprise at least one of the information identifying the wireless device 101, e.g. the IMSI, and an Extensible Authentication Protocol-Subscriber Identity Module/Authentication and Key Agreement (EAP-SIM/AKA) parameter.

Step 403

Figure 3:
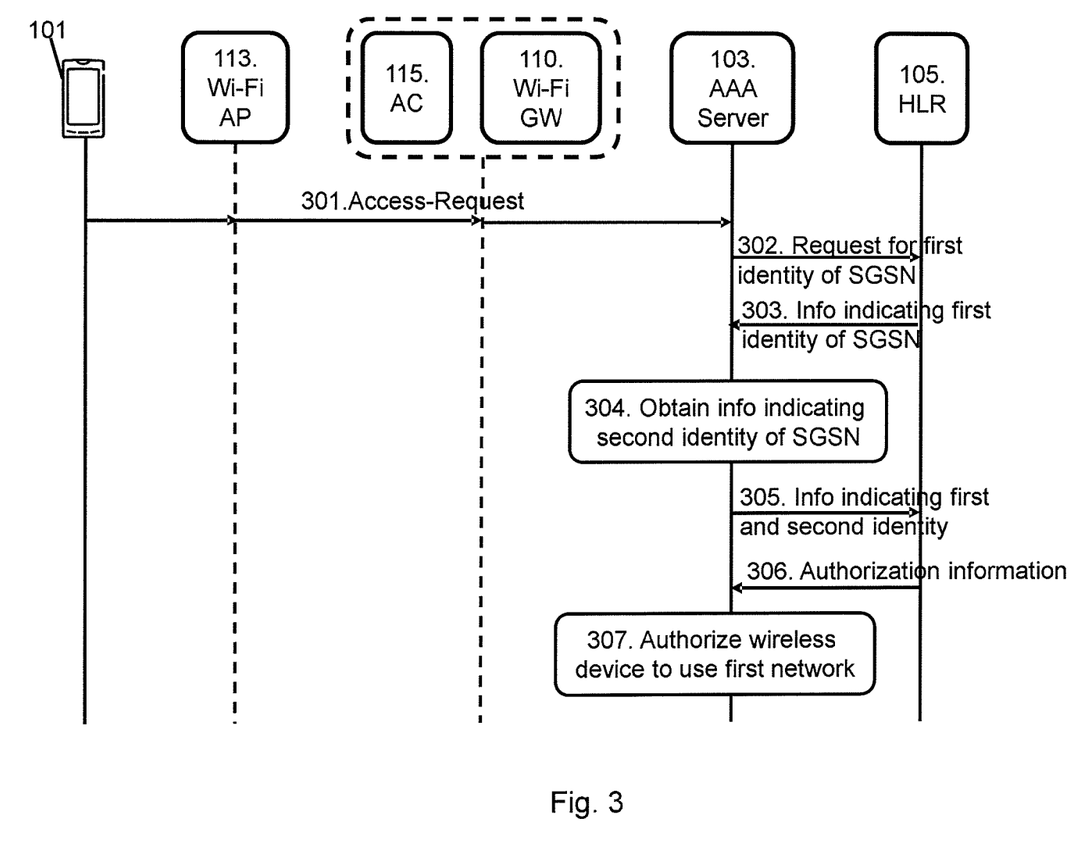
FIG. 3 is a signaling diagram illustrating embodiments of a method.

This step corresponds to step 203 in FIG. 2 and step 301 in FIG. 3. The wireless device 101 may send an EAP-Response/SIM/Start message (e.g. an access response message) to the AAA server 103. This message may be conveyed from the wireless device 101, through at least one of the Wi-Fi AP 113, the AC 115 and the Wi-Fi GW 110 on its way to the AAA server 103, indicated with three arrows in FIG. 4.

The EAP-Response/SIM/Start message (e.g. access response message) may comprise at least one of information identifying the wireless device 101, e.g. the IMSI, and the EAP-SIM/AKA parameter.

The AAA server 103 may detect that the wireless device 101 requests access to the first network 100*a* by receipt of an access request message from a wireless GW 110. The access request message may be sent from the wireless device 101, via the wireless AP 113, the AC 115, the wireless GW 110 and to the AAA server 105.

Step 404

This step corresponds to step 204 in FIG. 2. The AAA server 103 may send a request for authentication information to the HLR 105. The request may be a SendAuthInfo message. The request may comprise information identifying the wireless device 101, such as the IMSI or any other suitable parameter identifying the wireless device 101.

Step 405

This step corresponds to step 205 in FIG. 2. The HLR 105 may send a response back to the AAA server 103, i.e. a response to the request in step 404. The response may be a SendAuthInfo message. The response message may comprise information identifying authentication vectors, for instance GSM triplets comprising parameters such as e.g. RANDom number (RAND), Signed RESponse (SRES) and the ciphering key Kc.

Step 406

This step corresponds to step 302 in FIG. 3. In this step 406, the request for information indicating the first identity of the SGSN 108 is in the form of a MAP_SEND_ROUTING_INFO_FOR_GPRS message sent from the AAA server 103 to the HLR 105. The MAP_SEND_ROUTING_INFO_FOR_GPRS message may be described as being information associated with routing for GPRS to the HLR 105. The information may comprise information identifying the wireless device 101, e.g. the IMSI, any other suitable parameters.

Step 407

This step corresponds to step 303 in FIG. 3. The HLR 105 may send a response to the information sent in step 406. In this embodiment illustrated in FIG. 4, the first identity of the SGSN 108 sent to the AAA server 103 in step 407 is represented by an SGSN address.

After the AAA server 103 has received the first identity, the AAA server 103 may obtain further information indicating the current SGSN 108, e.g. a second identity of the current SGSN 108. The second identity may be obtained based on the first identity of the current SGSN 108 received from the HLR 105 in step 303. The AAA server 103 may comprise a table with associations between all first and second identities of all possible SGSNs. So, when obtaining the information indicating the second identity, the AAA server 103 may look in the table to find the second identity which corresponds to the first identity that it has received from the HLR 105. The second identity may be a SGSN number, e.g. the ISDN number.

Step 408

This step corresponds to step 305 in FIG. 3. The information indicating the first and second identity of the current SGSN 108 may be sent in a MAP_UPDATE_GPRS_LOCATION message, and may be described as information indicating an updated GPRS location of the wireless device 101. The information may comprise information identifying the wireless device 101, e.g. the IMSI and information identifying the SGSN 108, e.g. at least one of an SGSN address (e.g. the first identity) and a SGSN number (e.g. the second identity). The information identifying the SGSN 108 is interpreted as a new SGSN by the HLR 105.

Step 409

This step corresponds to step 306 in FIG. 3. The authorization information may be sent in an InsertSubscriberData message from the HLR 105 to the AAA server 103. The authorization information may be described as information indicating subscription data associated with the wireless device 101. The information may comprise information identifying the subscriber of the wireless device 101, e.g. a MSISDN, ODB parameter, information indicating a GPRS profile etc.

Steps 410, 411, 412 and 413 described below indicate the success of the EAP-SIM signaling to the Wi-Fi AP 113.

Step 410

This step corresponds to step 210 in FIG. 2. The AAA server 103 may send an EAP Request/SIM/Challenge message (e.g. an access challenge message) to the wireless device 101. This message may be conveyed from the AAA server 103, through at least one of the Wi-Fi GW 110, the AC 115 and the Wi-Fi AP 113 on its way to the wireless device 101, indicated with three arrows in FIG. 4. The access challenge message may comprise at least one EAP-SIM parameter etc.

Step 411

This step corresponds to step 211 in FIG. 2. The wireless device 101 may send an EAP Response/SIM/Challenge message (e.g. an access request message) to the AAA server 103. This message may be conveyed from the wireless device 101, through at least one of the Wi-Fi AP 113, the AC 115 and the Wi-Fi GW 110 on its way to the AAA server 103, indicated with three arrows in FIG. 4. The access request message may comprise at least one EAP-SIM parameter.

Step 412

This step corresponds to step 212 in FIG. 2. The AAA server 103 may send an access accept message to the Wi-Fi AP 113. The access accept message may comprise at least one of, e.g. an ODB parameter, a GPRS profile associated with the wireless device 101, an EAP-success indicator, etc.

Step 413

This step corresponds to step 213 in FIG. 2. The Wi-Fi AP 113 may send an access accept message to the wireless device 101. The access accept message may comprise information indicating the EAP success. Thus, the wireless device 101 is authorized to use wireless access such as e.g. Wi-Fi.

The steps shown in FIG. 4 can be executed in a different order than shown in FIG. 4. For example, steps 404 and 405 may be implemented after steps 406, 407, 408 and 409 only in the case when the wireless device 101 is authorized successfully to be allowed to use Wi-Fi network. Another example is that the whole authentication of the wireless device 101 is performed first, and the authorization related steps are only performed after a successful authentication (this would mean that the steps are performed in order 401-405, 410, 411, 406-409).

Figure 5:
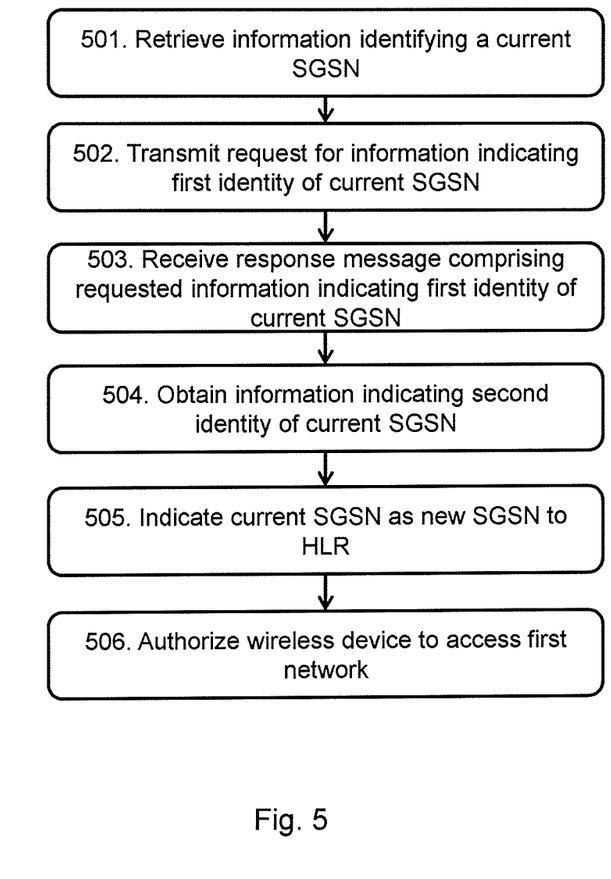
FIG. 5 is a flow chart illustrating embodiments of a method performed by the AAA server.

The method described above will now be described seen from the perspective of the AAA server 103. FIG. 5 is a flowchart describing the present method performed by the AAA server 103, for enabling authorization of a wireless device 101 to access the first network 100a while simultaneously accessing the second network 100b. In some embodiments, the first network 100a is a wireless network and the second network 100b is a 3GPP network. In some embodiments, the first network 100a is a Wi-Fi network and the second network 100b is a WCDMA network or a GSM network. The first network 100a may be a network using authentication that provides the IMSI. The first network 100a may be a network where authorization information associated with the second network 100b is comprised in the HLR 105. The first and second networks 100a, 100b may apply different access technologies. The different access technologies may use the HLR 105 as a central database.

The method seen in FIG. 5 comprises at least some of the following steps to be performed by the AAA server 103, which steps may be performed in any suitable order than described below:

Step 501

This step corresponds to steps 302, 303 and 304 in FIG. 3 and steps 406 and 407 in FIG. 4. The AAA server 103 retrieves information identifying a current SGSN 108 currently serving the wireless device 101 in the second network 100b.

The information identifying the current SGSN 108 may be a first and second identity of the current SGSN 108.

In some embodiments, information indicating the second identity of the current SGSN 108 is obtained by the AAA server 103 looking up in a table comprising associations between first identities and second identities of all possible SGSNs.

In some embodiments, the information identifying the current SGSN 108 is retrieved based on information identifying the wireless device 101.

In some embodiments, the AAA server 103 acts as a current gateway node towards the HLR 105 when retrieving the information identifying the current SGSN.

The current gateway node may be a current Gateway General packet radio service Support Node (GGSN) or the current SGSN 108.

In some embodiments, at least part of the information identifying the current SGSN 108 is retrieved from the HLR 105 by transmission of a MAP_SEND_ROUTING_INFO_FOR_GPRS message to the HLR 105.

The retrieving may comprise sending a request message and receiving a response message.

Step 502

This step corresponds to step 302 in FIG. 3 and step 406 in FIG. 4. This step may be seen as a substep of step 501. In some embodiments, when the wireless device 101 requests access to the first network 100a, the AAA server transmits, to the HLR 105, a request for information indicating a first identity of the current SGSN 108.

The request for the information identifying the current SGSN 108 may comprise information identifying the wireless device 101. The information identifying the wireless device 101 may be the IMSI. The HLR 105 may find the information identifying the current SGSN 108 based on the information identifying the wireless device 101.

Step 503

This step corresponds to step 303 in FIG. 3 and step 407 in FIG. 4. This step may be seen as a substep of step 501. In some embodiments, the AAA server 103 receives, from the HLR 105, a response message comprising the requested information indicating the first identity of the current SGSN 108. The first identity of the SGSN 108 may be an address of the SGSN 108.

Step 504

This step corresponds to step 304 in FIG. 3. This step may be seen as a substep of step 501. In some embodiments, the AAA server 103, based on the received first identity of the current SGSN 108, obtains information indicating a second identity of the current SGSN 108. The information indicating the second identity of the current SGSN may be an ISDN number.

Step 505

This step corresponds to step 305 in FIG. 3 and step 408 in FIG. 4. When the AAA server 103 retrieves authorization information for the wireless device's 101 access to the first network 100a from a HLR 105, the AAA server 103 indicates the current SGSN 108 as a new SGSN to the HLR 105. The indication is to be interpreted by the HLR 105 as an update of location information or a refresh procedure from the current SGSN 108.

The information indicating the first and second identity of the current SGSN 108 may be transmitted to the HLR 105 when the AAA server 103 retrieves the authorization information.

In some embodiments, the current SGSN 108 is indicated as a new SGSN in a MAP_UPDATE_GPRS_LOCATION message transmitted to the HLR 105.

The authorization information received from the HLR 105 may be a GPRS profile.

The HLR 105 may consider that the first and second identities are for a new SGSN.

Step 506

This step corresponds to step 307 in FIG. 3 and step 410 in FIG. 4. In some embodiments, the AAA server 103, based on the retrieved authorization information, authorizes the wireless device 101 to access the first network 100a.

The method described above in relation to FIG. 5 may also be described as follows: When the wireless device requests access to the first network 100a, the AAA server 103 transmits, to the HLR 105, a request for information indicating a first identity of a current SGSN 108 serving the wireless device 101 in the second network 100n. The AAA server 103 receives, from the HLR 105, a response comprising the requested information indicating the first identity of the current SGSN 108. The AAA server 103 obtains information indicating a second identity of the current SGSN 108 based on the received first identity of the current SGSN 108. The AAA server 103 transmits, to the HLR 105, information indicating the first identity and the second identity of the current SGSN 108. Furthermore, the AAA server 103 receives, from the HLR 105, information associated with authorization of the wireless device 101 to the first network 100a. Based on the received authorization information, the AAA server 103 authorizes the wireless device 101 to access the first network 100a.

Figure 6:
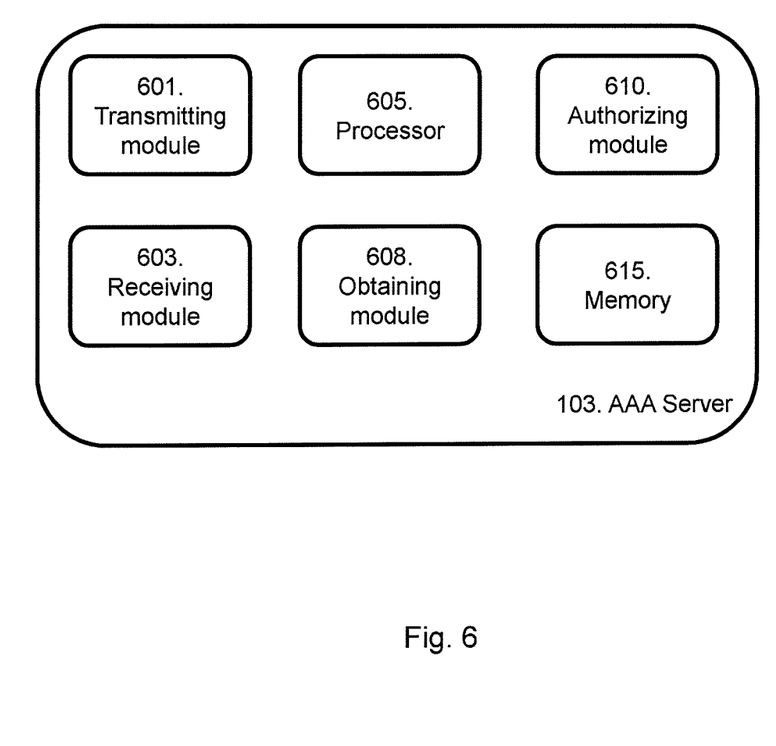
FIG. 6 is a schematic block diagram illustrating embodiments of the AAA server.

To perform the method steps shown in FIGS. 3, 4 and 5 for enabling authorization of a wireless device 101 to access a first network 100a while simultaneously accessing a second network 100b, the AAA server 103 may comprise an arrangement as shown in FIG. 6. The AAA server 103 may be adapted to perform any of the steps 302-307 in FIG. 3 and any of the corresponding steps in FIG. 4 and FIG. 5. The AAA server 103 may comprise processing means which performs any of the above mentioned steps. In some embodiments, the first network 100a is a wireless network and the second network 100b is a 3GPP network. In some embodiments, the first network 100a is a Wi-Fi network and the second network 100b is a WCDMA network or a GSM network.

The AAA server 103 is arranged to, e.g. by means of a retrieving module, retrieve information identifying a current SGSN 108 currently serving the wireless device 101 in the second network 100b. The information identifying the current SGSN 108 may be a first and second identity of the current SGSN 108. The AAA server 103 may be arranged to act as a current gateway node towards the HLR 105 when retrieving the information identifying the current SGSN. The current gateway node may be a current GGSN or the current SGSN 108. The retrieving module may be a combination of a transmitting module 601 and a receiving module 603. The retrieving module may be a processor 605 of the AAA server 103. The retrieving module may also be referred to as a retrieving unit, a retrieving means, a retrieving circuit or means for retrieving.

The transmitting module 601 may also be referred to as a transmitting unit, a transmitting means, a transmitting circuit, means for transmitting or an output unit. The transmitting module 601 may be a transmitter, a transceiver etc. The transmitting module 601 may be a wireless transmitter of the AAA server 103 of a wireless or fixed communications system. The receiving module 603 may also be referred to as a receiving unit, a receiving means, a receiving circuit, means for receiving or an input unit. The receiving module 603 may be a receiver, a transceiver etc. The receiving module 603 may be a wireless receiver of the AAA server 103 of a wireless or fixed communications system.

The AAA server 103 is arranged to, e.g. by means of the transmitting module 601, indicate, when the AAA server 103 retrieves authorization information for the wireless device's 101 access to the first network 100a from a HLR 105, the current SGSN 108 as a new SGSN to the HLR 105. The indication is to be interpreted by the HLR 105 as an update of location information or as a refresh procedure from the current SGSN 108. The current SGSN 108 may be indicated as a new SGSN in a MAP_UPDATE_GPRS_LOCATION message transmitted to the HLR 105.

In some embodiments, the AAA server 103 is arranged to, e.g. by means of the transmitting module 601, when the wireless device 101 requests access to the first network 100a, transmit, to the HLR 105, a request for information indicating a first identity of the current SGSN 108.

In some embodiments, the AAA server 103 is arranged to, e.g. by means of the receiving module 603, receive, from the HLR 105, a response message comprising the requested information indicating the first identity of the current SGSN 108.

In some embodiments, the AAA server 103 is arranged to, e.g. by means of an obtaining module 608, obtain, based on the received first identity of the current SGSN 108, information indicating a second identity of the current SGSN 108. The obtaining module 608 may be the processor 605 of the AAA server 103. The obtaining module 608 may also be referred to as an obtaining unit, an obtaining means, an obtaining circuit or means for obtaining.

In some embodiments, the AAA server 103 is arranged to, e.g. by means of the transmitting module 601, transmit information indicating the first and second identity of the current SGSN 108 to the HLR 105 when the AAA server 103 retrieves the authorization information.

In some embodiments, the AAA server 103 is arranged to, e.g. by means of the obtaining module 608, obtain information indicating a second identity of the current SGSN 108 by looking up in a table comprising associations between first identities and second identities of all possible SGSNs.

In some embodiments, the AAA server 103 is arranged to, e.g. by means of an authorizing module 610, authorize, based on the retrieved authorization information, the wireless device 101 to access the first network 100a. The authorizing module 610 may be the processor 605 of the AAA server 103. The authorizing module 610 may also be referred to as an authorizing unit, an authorizing means, an authorizing circuit or means for authorizing.

In some embodiments, the AAA server 103 is arranged to, e.g. by means of the retrieving module, retrieve the information identifying the current SGSN 108 based on information identifying the wireless device 101.

In some embodiments, the AAA server 103 is arranged to, e.g. by means of the retrieving module, retrieve at least part of the information identifying the current SGSN 108 from the HLR 105 by transmission of a MAP_SEND_ROUTING_INFO_FOR_GPRS message to the HLR 105.

In some embodiments, the AAA server 103 may comprise the transmitting module 601 adapted to transmit the messages in e.g. steps 302 and 305 in FIG. 3 and the corresponding steps in FIG. 4 and FIG. 5.

Furthermore, the AAA server 103 may comprise the receiving module 603 being adapted to receive the messages and information in steps 303 and 306 in FIG. 3 and the corresponding steps in FIG. 4 and FIG. 5. For instance, the transmitting and receiving modules 601, 603 may operate using the Transmission Control Protocol/Internet Protocol (TCP/IP) protocol on the Ethernet or using optical physical access.

The AAA server 103 may comprise the obtaining module 608 being adapted to obtain the information indicating the second identity of the current SGSN in step 304 in FIG. 3 and the corresponding steps in FIG. 4 and FIG. 5.

The AAA server 103 may further comprise a memory 615 comprising one or more memory units. The memory 615 is arranged to store data, received data streams, first identities, second identities, IMSI, authorization information, information indicating the current SGSN 108, threshold values, time periods, configurations, schedulings, and applications to perform the methods herein when being executed in the AAA server 103.

The AAA server 103 may also comprise the authorizing module 610 being adapted to authorize the wireless device 101 to access the first network 100a in step 307 in FIG. 3.

The processing means may comprise the processor 608 and the memory 615, and the memory 615 comprises instructions executable by the processor 608.

Those skilled in the art will also appreciate that the retrieving module, the transmitting module 601, the receiving module 603, the authenticating module 610 and the obtaining module 608 described above may refer to a combination of analog and digital circuits, and/or one or more processors configured with software and/or firmware, e.g. stored in a memory, that when executed by the one or more processors such as the processor 608 performed as described below.

The present mechanism for enabling authorization of a wireless device 101 to access a first network 100a while simultaneously accessing a second network 100b may be implemented through one or more processors, such as the processor 605 in the AAA server 103 depicted in FIG. 6, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the AAA server 103. One such carrier may be in the form of a CD ROM disc. It is however feasible with other data carriers such as a memory stick. The computer program code can furthermore be provided as pure program code on a server and downloaded to the AAA server 103.

A computer program product or a computer program may be directly loadable into an internal memory (e.g. the memory 615) of a digital computer within at least one entity of the AAA server 103 according to the above description and as seen in FIG. 6. The computer program product comprises software code portions for performing the method according to any one of the steps in at least one of the FIGS. 3, 4 and 5 when said product is run on a computer.

A computer program product or a computer program may be stored on a computer usable medium (e.g. the memory 615). The computer program product comprises a computer readable program for causing a computer, within an entity in the AAA server 103 according to the above description and as seen in FIG. 6, to control an execution of the method according to any one of the steps seen in at least one of the FIGS. 3, 4 and 5.

Summarized, the embodiments herein relate to authentication and authorization of access for a wireless device 101 to a first network 100a, such as e.g. a Wi-Fi network, with EAP-SIM/AKA/AKA messages while simultaneously being connected to a second network 100b, such as e.g. a 3GPP network. More particularly, the embodiments herein relate to how to authorize use of the first network 100a through communication between an AAA server 103 and a HLR 105. The AAA server 103 may be described as mimicking a specific current SGSN 108 when retrieving authorization information from the HLR 105. The embodiments herein further relates to a way of acquiring information indicating the currently serving SGSN 108.

The embodiments herein suggest that instead of the AAA server 103 mimicking or acting like a new SGSN 108 when it aims to retrieve data (when the AAA server 103 sends an UpdateGPRSLocation message to the HLR 105) and gets the HLR 105 to send the InsertSubscriberData message to the AAA server 103, the AAA server 103 should specifically mimic the current SGSN 108 and make the HLR 105 interpret the UpdateGPRSLocation message as merely an update of location information or as a refresh procedure from the current SGSN 108. This way, there will be no cancelLocation message sent from the HLR 105 to the serving current SGSN 108 and there will be no Release procedure on the 3GPP network side as a consequence of authorization of the wireless device 101 in the wireless network, e.g. the Wi-Fi RAT.

The embodiments herein solve the issue of the HLR 105 automatically sending a CancelLocation request to the old (current) SGSN 108 when asked by the AAA server 103 for authentication information for the wireless device 103 which is served by the old (current) SGSN 108. The terms old SGSN, current SGSN and serving SGSN may be used interchangeably in this document.

When a MAP_UPDATE_GPRS_LOCATION message is sent from the AAA server 103 to the HLR 105 to retrieve the GPRS profile for the wireless device 101, the AAA server 103 first finds out which is the current WCDMA SGSN 108 for the wireless device 101 and then indicates this current WCDMA SGSN 108 as the new SGSN 108 towards the HLR 105. The HLR 105 will not send any MAP_CANCEL_LOCATION message to the real current WCDMA SGSN 108 as this is merely seen as a refresh from the current SGSN 108. The current WCDMA SGSN 108 information in the MAP_UPDATE_GPRS_LOCATION may comprise both the SGSN Address (e.g. IP address) and the SGSN Number (e.g. the ISDN number).

In this operation, the AAA server 103 may need to perform at least one of the following steps:

1. The AAA server 103 may act as a gateway node such as e.g. a GGSN towards the HLR 105 to retrieve the information indicating the current SGSN 108. For this, the AAA server 103 may use the message MAP_SEND_ROUTING_INFO_FOR_GPRS to retrieve the SGSN Address (e.g. the first identity) based on the IMSI of the wireless device 101.
2. The AAA server 103 may need to also have a local database (e.g. the memory 615 described below with reference to FIG. 6) comprising the SGSN Address (e.g. the first identity) and the SGSN Number (e.g. the second identity) associations (as the response to MAP_SEND_ROUTING_INFO_FOR_GPRS only includes the SGSN Address information).
3. The AAA server 103 may then include both the SGSN Address and the SGSN Number in the MAP_UPDATE_GPRS_LOCATION message towards the HLR 105.

As the MAP_UPDATE_GPRS_LOCATION message is a transaction-based procedure in the HLR 105, the HLR 105 sees this as just an update and returns the GPRS profile to the AAA server 103 without sending any MAP_CANCEL_LOCATION message towards the current WCDMA SGSN 108.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in this document.

The invention claimed is:

1. A method in an Authentication, Authorization and Accounting, AAA, server for enabling authorization of a wireless device to access a first network while simultaneously accessing a second network in a communication network, the method comprising:
   retrieving information identifying a current Serving General packet radio service Support Node, SGSN, currently serving the wireless device in the second network;
   when the AAA server retrieves authorization information for the wireless device's access to the first network from a Home Location Register, HLR, indicating the current SGSN as a new SGSN to the HLR, which indication is to be interpreted by the HLR as an update of location information or a refresh procedure from the current SGSN, wherein information identifying a second identity of the current SGSN is obtained by the AAA server looking UP in a table comprising associations between first identities and second identities of all possible SGSNs; and
   authorizing, based on the retrieved authorization information, the wireless device to access the first network while simultaneously accessing the second network, wherein the HLR does not send a cancel location message to the current SGSN and no release procedure is performed on the second network as a consequence of the authorization of the wireless device in the first network, thereby reducing signaling in the communication network.

2. The method according to claim 1, wherein the retrieving the information indicating the current SGSN further comprises:
   when the wireless device requests access to the first network, transmitting, to the HLR, a request for information indicating a first identity of the current SGSN;
   receiving, from the HLR, a response message comprising the requested information indicating the first identity of the current SGSN; and
   based on the received first identity of the current SGSN, obtaining information indicating a second identity of the current SGSN.

3. The method according to claim 1, wherein the information identifying the current SGSN is a first identity and a second identity of the current SGSN, and wherein information indicating the first and second identity of the current SGSN is transmitted to the HLR when the AAA server retrieves the authorization information from the HLR.

4. The method according to claim 1, wherein the information identifying the current SGSN is retrieved based on information identifying the wireless device.

5. The method according to claim 1, wherein the AAA server acts as a current gateway node towards the HLR when retrieving the information identifying the current SGSN.

6. The method according to claim 5, wherein the current gateway node is a current Gateway General packet radio service Support Node, GGSN, or the current SGSN.

7. The method according to claim 1, wherein the current SGSN is indicated as a new SGSN in a MAP_UPDATE_GPRS_LOCATION message transmitted to the HLR.

8. The method according to claim 1, wherein at least part of the information identifying the current SGSN is retrieved from the HLR by transmission of a MAP_SEND_ROUTING_INFO_FOR_GPRS message to the HLR.

9. The method according to claim 1, wherein the first network is a wireless network and the second network is a Third Generation Partnership Project, 3GPP, network; or
   wherein the first network is a Wi-Fi network and the second network is a Wideband Code Division Multiple Access, WCDMA, network or a Global System for Mobile communications, GSM, network.

10. An Authentication, Authorization and Accounting, AAA, server for enabling authorization of a wireless device to access a first network while simultaneously accessing a second network in a communication network, the AAA server being arranged to:
    retrieve information identifying a current Serving General packet radio service Support Node, SGSN, currently serving the wireless device in the second network;
    when the AAA server retrieves authorization information for the wireless device's access to the first network from a Home Location Register, HLR, indicate the current SGSN as a new SGSN to the HLR, which indication is to be interpreted by the HLR as an update of location information or a refresh procedure from the current SGSN, wherein the AAA server is arranged to obtain information identifying a second identity of the current SGSN by looking up in a table comprising associations between first identities and second identities of all possible SGSNs; and
    authorize, based on the retrieved authorization information, the wireless device to access the first network while simultaneously accessing the second network, wherein the HLR does not send a cancel location message to the current SGSN and no release procedure is performed on the second network as a consequence of the authorization of the wireless device in the first network, thereby reducing signaling in the communication network.

11. The AAA server according to claim 10, wherein the AAA server is further arranged to, when retrieving the information indicating the current SGSN:
when the wireless device requests access to the first network, transmit, to the HLR, a request for information indicating a first identity of the current SGSN;
receive, from the HLR, a response message comprising the requested information indicating the first identity of the current SGSN; and
based on the received first identity of the current SGSN, obtain information indicating a second identity of the current SGSN.

12. The AAA server according to claim 10, wherein the information identifying the current SGSN is a first identity and second identity of the current SGSN, and wherein the AAA server is arranged to transmit information indicating the first and second identity of the current SGSN to the HLR when the AAA server retrieves the authorization information from the HLR.

13. The AAA server according to claim 10, wherein the AAA server is arranged to retrieve the information identifying the current SGSN based on information identifying the wireless device.

14. The AAA server according to claim 10, wherein the AAA server is arranged to act as a current gateway node towards the HLR when retrieving the information identifying the current SGSN.

15. The AAA server according to claim 14, wherein the current gateway node is a current Gateway General packet radio service Support Node, GGSN, or the current SGSN.

16. The AAA server according to claim 10, wherein the current SGSN is indicated as a new SGSN in a MAP_UPDATE_GPRS_LOCATION message transmitted to the HLR.

17. The AAA server according to claim 10, wherein the AAA server is arranged to retrieve at least part of the information identifying the current SGSN from the HLR by transmission of a MAP_SEND_ROUTING_INFO_FOR_GPRS message to the HLR.

18. The AAA server according to claim 10, wherein the first network is a wireless network and the second network is a Third Generation Partnership Project, 3GPP, network; or
wherein the first network is a Wi-Fi network and the second network is a Wideband Code Division Multiple Access, WCDMA, network or a Global System for Mobile communications, GSM, network.

19. A computer program product comprising a non-transitory computer readable medium storing computer executable instructions for, in an Authentication, Authorization and Accounting, AAA, server for enabling authorization of a wireless device to access a first network while simultaneously accessing a second network in a communication network, causing the AAA server to:
retrieve information identifying a current Serving General packet radio service Support Node, SGSN, currently serving the wireless device in the second network;
when the AAA server retrieves authorization information for the wireless device's access to the first network from a Home Location Register, HLR, indicate the current SGSN as a new SGSN to the HLR, which indication is to be interpreted by the HLR as an update of location information or a refresh procedure from the current SGSN, wherein information identifying a second identity of the current SGSN is obtained by the AAA server looking UP in a table comprising associations between first identities and second identities of all possible SGSNs; and
authorize, based on the retrieved authorization information, the wireless device to access the first network while simultaneously accessing the second network, wherein the HLR does not send a cancel location message to the current SGSN and no release procedure is performed on the second network as a consequence of the authorization of the wireless device in the first network, thereby reducing signaling in the communication network.

\* \* \* \* \*